United States Patent
Mantiply et al.

(10) Patent No.: US 11,330,164 B2
(45) Date of Patent: May 10, 2022

(54) DETERMINING FOCUS SETTINGS FOR SPECIMEN SCANS

(71) Applicant: KLA Corporation, Milpitas, CA (US)

(72) Inventors: Bryant Mantiply, Mountain View, CA (US); Xiumei Liu, Fremont, CA (US); Matthew Giusti, Portland, OR (US); Kai Cao, Fremont, CA (US); Richard Wallingford, Ames, IA (US)

(73) Assignee: KLA Corp., Milpitas, CA (US)

( * ) Notice: Subject to any disclaimer, the term of this patent is extended or adjusted under 35 U.S.C. 154(b) by 0 days.

(21) Appl. No.: 17/195,614

(22) Filed: Mar. 8, 2021

(65) Prior Publication Data

US 2021/0297600 A1 Sep. 23, 2021

Related U.S. Application Data

(60) Provisional application No. 62/991,035, filed on Mar. 17, 2020.

(51) Int. Cl.
*H04N 5/232* (2006.01)
*G06T 7/00* (2017.01)

(52) U.S. Cl.
CPC ..... *H04N 5/232125* (2018.08); *G06T 7/0004* (2013.01); *G06T 2207/10148* (2013.01); *G06T 2207/30148* (2013.01)

(58) Field of Classification Search
None
See application file for complete search history.

(56) References Cited

U.S. PATENT DOCUMENTS

| | | | |
|---|---|---|---|
| 7,570,796 B2 | 8/2009 | Zafar et al. | |
| 7,676,077 B2 | 3/2010 | Kulkarni et al. | |
| 8,126,255 B2 | 2/2012 | Bhaskar et al. | |
| 8,237,213 B2 | 8/2012 | Liu | |
| 9,222,895 B2 | 12/2015 | Duffy et al. | |
| 2003/0053676 A1* | 3/2003 | Shimoda | G06T 7/0002 382/145 |
| 2003/0228050 A1* | 12/2003 | Geshel | G06T 7/0006 382/149 |
| 2004/0056173 A1 | 3/2004 | Oberski et al. | |
| 2004/0129859 A1 | 7/2004 | Sonksen et al. | |

(Continued)

FOREIGN PATENT DOCUMENTS

WO 2016/012316 1/2013

OTHER PUBLICATIONS

International Search Report and Written Opinion for PCT/US2021/022030 dated Jun. 25, 2021.

*Primary Examiner* — Stefan Gadomski
(74) *Attorney, Agent, or Firm* — Ann Marie Mewherter

(57) ABSTRACT

Methods and systems for determining focus settings for use in a specimen scan are provided. One method includes generating a focus map defined as values of best focus as a function of position on a specimen using output generated in one or more pre-focus swaths scanned on the specimen by an output acquisition subsystem configured to direct energy to a specimen, to detect energy from the specimen, and to generate output responsive to the detected energy. The method also includes interpolating the focus map to generate focus settings for a scan performed on the specimen during a process and storing information for the generated focus settings for use in the scan performed on the specimen during the process.

23 Claims, 4 Drawing Sheets

(56) References Cited

U.S. PATENT DOCUMENTS

| | | | |
|---|---|---|---|
| 2004/0256538 A1 | 12/2004 | Olson et al. | |
| 2005/0270611 A1* | 12/2005 | Oshiro | G02B 21/245 |
| | | | 713/186 |
| 2006/0238847 A1* | 10/2006 | Gouch | H04N 1/00063 |
| | | | 359/202.1 |
| 2007/0069106 A1* | 3/2007 | Krief | G02B 21/244 |
| | | | 250/201.3 |
| 2009/0212213 A1 | 8/2009 | Nakasuji et al. | |
| 2012/0287256 A1* | 11/2012 | Hulsken | G02B 21/367 |
| | | | 348/79 |
| 2015/0006105 A1* | 1/2015 | Zhou | G02B 21/241 |
| | | | 702/150 |
| 2015/0029499 A1* | 1/2015 | Wright | G01N 21/9501 |
| | | | 356/237.5 |
| 2015/0168701 A1* | 6/2015 | Gough | G02B 21/367 |
| | | | 359/383 |
| 2015/0260973 A1* | 9/2015 | Kusakabe | G02B 21/244 |
| | | | 348/79 |
| 2017/0160648 A1 | 6/2017 | Tel et al. | |
| 2017/0169559 A1* | 6/2017 | Tsai | G01N 21/00 |
| 2018/0103247 A1* | 4/2018 | Kolchin | H04N 13/254 |
| 2019/0378012 A1* | 12/2019 | Tripodi | G01B 11/02 |

\* cited by examiner

DETERMINING FOCUS SETTINGS FOR SPECIMEN SCANS

BACKGROUND OF THE INVENTION

1. Field of the Invention

This invention generally relates to methods and systems for determining focus settings for use in a specimen scan.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and thus higher profits. Inspection has always been an important part of fabricating semiconductor devices such as ICs. However, as the dimensions of semiconductor devices decrease, inspection becomes even more important to the successful manufacture of acceptable semiconductor devices because smaller defects can cause the devices to fail.

Defect review typically involves re-detecting defects detected as such by an inspection process and generating additional information about the defects at a higher resolution using either a high magnification optical system or a scanning electron microscope (SEM). Defect review is therefore performed at discrete locations on the wafer where defects have been detected by inspection. The higher resolution data for the defects generated by defect review is more suitable for determining attributes of the defects such as profile, roughness, more accurate size information, etc.

Metrology processes are also used at various steps during a semiconductor manufacturing process to monitor and control the process. Metrology processes are different than inspection processes in that, unlike inspection processes in which defects are detected on a wafer, metrology processes are used to measure one or more characteristics of the wafer that cannot be determined using currently used inspection tools. For example, metrology processes are used to measure one or more characteristics of a wafer such as a dimension (e.g., line width, thickness, etc.) of features formed on the wafer during a process such that the performance of the process can be determined from the one or more characteristics. In addition, if the one or more characteristics of the wafer are unacceptable (e.g., out of a predetermined range for the characteristic(s)), the measurements of the one or more characteristics of the wafer may be used to alter one or more parameters of the process such that additional wafers manufactured by the process have acceptable characteristic(s).

Metrology processes are also different than defect review processes in that, unlike defect review processes in which defects that are detected by inspection are re-visited in defect review, metrology processes may be performed at locations at which no defect has been detected. In other words, unlike defect review, the locations at which a metrology process is performed on a wafer may be independent of the results of an inspection process performed on the wafer. In particular, the locations at which a metrology process is performed may be selected independently of inspection results. In addition, since locations on the wafer at which metrology is performed may be selected independently of inspection results, unlike defect review in which the locations on the wafer at which defect review is to be performed cannot be determined until the inspection results for the wafer are generated and available for use, the locations at which the metrology process is performed may be determined before an inspection process has been performed on the wafer.

One of the parameters that can significantly affect the performance of quality control type processes such as those described above is the focus of the tool that performs the scan or measurements of the specimen. In other words, if the system happens to be out of focus during a scan or measurement, then any characteristics of the specimen determined from the output generated during that scan or measurement will be less accurate than if the system was in focus during the scan or measurement.

Even if the tool is focused prior to a measurement or scan, when the tool scans over the specimen or performs measurements at other locations on the specimen, the tool can drift out of focus. In particular, the specimens described herein may not be substantially flat, and/or the flatness of the specimens can vary across the specimens. For example, process variation on specimens such as wafers can cause relatively large focus tracking errors during wafer scanning or measurement. In addition, some specimens described herein can include layers that can be penetrated by the light used by the tools and/or can include layers that include patterned features that are located well below the uppermost surface of the specimen. For example, some systems may have little to no control over the focus depths within substantially large Z 3D inspections. Therefore, sometimes the autofocus elements of such systems will track the desired top surface and sometimes they will track to features in the underlying structure causing the top surface to go out of focus. Without knowing where the focal plane of the tool is relative to the specimen during a scan or measurement, therefore, the output generated during the scan or measurement can be misinterpreted, may be useless, or may produce inaccuracies in the results generated from the output.

Accordingly, it would be advantageous to develop systems and/or methods for determining focus settings for use in a specimen scan that do not have one or more of the disadvantages described above.

SUMMARY OF THE INVENTION

The following description of various embodiments is not to be construed in any way as limiting the subject matter of the appended claims.

One embodiment relates to a system configured for determining focus settings for use in a specimen scan. The system includes an output acquisition subsystem configured to direct energy to a specimen, to detect energy from the specimen, and to generate output responsive to the detected energy. The system also includes one or more computer subsystems configured for generating a focus map defined as values of best focus as a function of position on the specimen using the output generated in one or more pre-focus swaths scanned on the specimen by the output acquisition subsystem. The one or more computer subsystems are also configured for interpolating the focus map to generate focus settings for a scan performed on the specimen during a process. In addition, the one or more computer subsystems are configured for storing information for the generated focus settings for use in the scan performed on the specimen during the process. The system may be further configured as described herein.

Another embodiment relates to a computer-implemented method for determining focus settings for use in a specimen scan. The method includes generating a focus map defined as values of best focus as a function of position on a specimen using output generated in one or more pre-focus swaths scanned on the specimen by an output acquisition subsystem configured to direct energy to a specimen, to detect energy from the specimen, and to generate output responsive to the detected energy. The method also includes interpolating the focus map to generate focus settings for a scan performed on the specimen during a process. In addition, the method includes storing information for the generated focus settings for use in the scan performed on the specimen during the process. The generating, interpolating, and storing steps are performed by one or more computer subsystems coupled to the output acquisition subsystem.

Each of the steps of the method described above may be performed as described further herein. The method described above may include any other step(s) of any other method(s) described herein. The method described above may be performed by any of the systems described herein.

An additional embodiment relates to a non-transitory computer-readable medium storing program instructions executable on a computer system for performing a computer-implemented method for determining focus settings for use in a specimen scan. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Other objects and advantages of the invention will become apparent upon reading the following detailed description and upon reference to the accompanying drawings in which.

Figure 1:
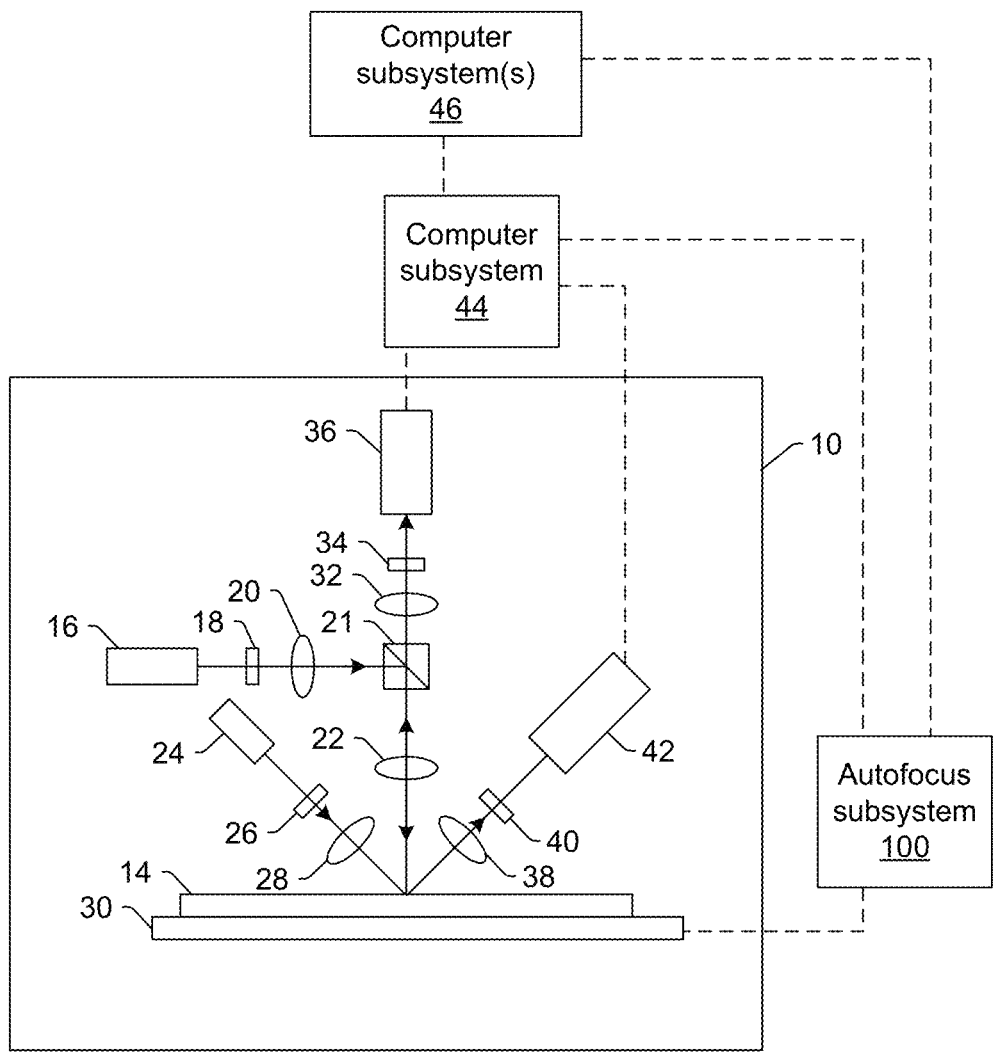
FIG. 1 is a schematic diagram illustrating a side view of an embodiment of a system configured as described herein.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The terms "design," "design data," and "design information" as used herein generally refer to the physical design (layout) of an IC and data derived from the physical design through complex simulation or simple geometric and Boolean operations. In addition, an image of a reticle acquired by a reticle inspection system and/or derivatives thereof can be used as a "proxy" or "proxies" for the design. Such a reticle image or a derivative thereof can serve as a substitute for the design layout in any embodiments described herein that use a design. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data.

In general, however, the design information or data cannot be generated by imaging a wafer with a wafer inspection system. For example, the design patterns formed on the wafer may not accurately represent the design for the wafer and the wafer inspection system may not be capable of generating images of the design patterns formed on the wafer with sufficient resolution such that the images could be used to determine information about the design for the wafer. Therefore, in general, the design information or design data cannot be generated using a physical wafer. In addition, the "design" and "design data" described herein refers to information and data that is generated by a semiconductor device designer in a design process and is therefore available for use in the embodiments described herein well in advance of printing of the design on any physical wafers.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured for determining focus settings for use in a specimen scan. In one embodiment, the specimen is a wafer. The wafer may include any wafer known in the semiconductor arts. Although some embodiments may be described herein with respect to a wafer or wafers, the embodiments are not limited in the specimen for which they can be used. For example, the embodiments described herein may be used for specimens such as reticles, flat panels, personal computer (PC) boards, and other semiconductor specimens.

In one embodiment, the specimen includes a wafer having three-dimensional (3D) NAND structures formed thereon. 3D NAND (where NAND stands for not-AND, a type of logic gate in semiconductor devices) is a type of non-volatile flash memory that includes vertical stacks of multiple layers of memory cells. For example, the structure of 3D NAND generally includes silicon bit cell gates formed of alternating conductive and insulating layers formed on a wafer and separated by one or more high aspect ratio (HAR) structures such as charge traps formed of materials like silicon nitride and channel(s) formed on silicon. That vertical stacking of the memory cells gives the 3D NAND structures their 3D quality. Although some embodiments may be described herein as being used or configured for 3D NAND structures or wafers, the embodiments described herein may be used for determining focus settings for any specimen scan including those in which the characteristics of the specimen render maintaining in-focus conditions during the scan difficult.

As used herein, the term "HAR structure" refers to any structure characterized by an aspect ratio that exceeds 10:1 and may be as high as 100:1 in future generation devices. HAR structures often include hard mask layers (see, for example, U.S. Pat. No. 8,237,213 to Liu issued on Aug. 7, 2012, which is incorporated by reference as if fully set forth herein) to facilitate etch processes for HARs. In addition to vertical NAND or terabit cell array transistor (TCAT) structures, the embodiments described herein can be used for other HAR structures where light penetration into the structures is an inspection- and/or metrology-limiting factor. For example, dynamic random-access memory (DRAM) includes some such structures where the depth of deep trenches or holes etched into the substrate cause problems for maintaining an in-focus condition during inspection or metrology.

The embodiments described herein provide autofocus methods and systems that can be used to improve focus tracking of a preselected surface or plane of specimens such as the top surface of specimens such as wafers during 3D NAND inspection. The 3D nature of such semiconductor devices often causes mis-tracking of the existing autofocus due to a combination of process variation causing a bias in the autofocus z position as well as tracking features deeper within the 3D structure. The resulting out of focus images result in missing defects of interest (DOIs) during wafer inspection. The only existing method of mitigating this is to scan the wafer at different focus offsets resulting in a throughput penalty and generating a new defect population at each offset. In contrast, the embodiments described herein can use an image-based focus map acquired prior to each inspection (or other process) to correct for the above autofocus tracking errors by explicitly estimating the best focus of the top surface from a sequence of images taken at different z positions. The focus map is then applied during wafer inspection (or other quality control process) so that the inspection imagery (or other output) throughout the inspected (or scanned) area is always in focus. The embodiments enable inspection, metrology such as optical critical dimension (CD), film, and composition metrology, and other quality control processes for semiconductor devices with HAR structures (such as 3D NAND, vertical NAND (or VNAND), TCAT, etc.) and, more generally, for complex devices that are challenging for inspection, optical metrology, etc. due to the difficulties that such structures cause for maintaining an in-focus condition during scans of such specimens.

The system includes an output acquisition subsystem configured to direct energy to a specimen, to detect energy from the specimen, and to generate output responsive to the detected energy. One embodiment of such a system is shown in FIG. 1. In this embodiment, the energy directed to the specimen includes light, and the energy detected from the specimen includes light. As shown in FIG. 1, output acquisition subsystem 10 includes an illumination subsystem configured to direct light to specimen 14. In the embodiment shown in FIG. 1, the illumination subsystem includes two illumination channels, one configured to direct light to the specimen at a first angle of incidence (AOI) and another configured to direct light to the specimen at a second AOI. In addition, as shown in FIG. 1, the first AOI is a normal AOI, and the second AOI is an oblique AOI. Although two illumination channels and two AOIs are shown in FIG. 1, the output acquisition subsystem may include any suitable number of illumination channels (i.e., one or more illumination channels) configured to direct energy to the specimen at any suitable number of AOIs (one or more AOIs).

Each of the illumination channels includes at least one light source. For example, as shown in FIG. 1, the first illumination channel includes light source 16. Light from light source 16 is directed through optical element 18 and then lens 20 to beam splitter 21, which directs the light to lens 22. Lens 22 directs the light to specimen 14 at a normal angle of incidence. The second illumination channel includes light source 24. Light from light source 24 is directed through optical element 26 and then lens 28, which directs the light to specimen 14 at an oblique AOI. In this manner, in one embodiment, the first AOI includes a normal AOI, and the second AOI includes an oblique AOI. The oblique AOI may include any suitable oblique AOI and may vary depending on, for example, the characteristics of the specimen.

The first and second AOIs may also include different ranges of AOIs. For example, the first AOI may include a range of AOIs or be included in a first range of AOIs, and the second AOI may include a different range of AOIs or be included in a second range of AOIs. The first and second ranges of AOIs may be discrete and mutually exclusive of each other. However, the different ranges of AOIs do not necessarily need to be mutually exclusive of each other.

The AOIs at which the light is directed to the specimen may be alterable from that shown in FIG. 1, for example by changing the positions of one or more elements of one or more of the illumination channels and/or changing one or more parameters of one or more elements of the illumination subsystem. For example, in another embodiment, the first and second AOIs include different oblique AOIs. In one such embodiment, the parameters of the illumination channel that includes light source 16 may be altered so that it directs light to the specimen at an oblique AOI rather than a normal AOI as shown in FIG. 1. In another such embodiment, the illumination channel that includes light source 24 may be configured so that it directs light to the specimen at one oblique AOI at one time and another oblique AOI at another time.

The illumination subsystem may be configured to direct the light to the specimen at different AOIs at different times. For example, in one embodiment, the illumination subsystem is configured to direct the light to the specimen at a first AOI in a first scan of the specimen and to direct the light to the specimen at a second AOI in a second scan of the specimen. The first and second scans may be performed as described further herein. In one such embodiment, one of the illumination channels shown in FIG. 1 is used for the first scan, and the other of the illumination channels shown in FIG. 1 is used for the second scan. However, the same illumination channel may be used for the first and second scans with one or more parameters of the illumination channel altered between the scans to thereby change the AOI of the illumination channel.

In some instances, the illumination subsystem may be configured to direct light to the specimen at the first and second AOIs at the same time. For example, if light is directed to the specimen at different AOIs at the same time, one or more characteristics (e.g., wavelength, polarization, etc.) of the light directed to the specimen at different AOIs may be different such that light resulting from illumination of the specimen at the different AOIs can be discriminated from each other at the detector(s). In one such example, one of the illumination channels shown in FIG. 1 may be configured for illumination with a first range of wavelengths, and the other of the illumination channels may be configured for illumination with a second range of wavelengths different from the first. The different illumination channels may also or alternatively be configured for illumination with different polarizations.

In one embodiment, the first and second AOIs include different polar angles and the same one or more azimuthal angles. For example, the light may be directed to the specimen in the same plane of incidence (and/or centered in the same plane of incidence) and at different polar angles. In the embodiment shown in FIG. 1, the two illumination channels may be configured to direct light to the specimen in the same plane of incidence, which is the plane of the paper. The light directed to the specimen at the first and second AOIs may also be directed to the specimen at the same one azimuthal angle and/or at the same range of azimuthal angles. In any case, the different AOIs may be different only in polar angle (although the different AOIs do not necessarily need to have the same azimuthal angle(s)).

In another embodiment, a plane of incidence of the light directed to the specimen at the first and second AOIs is oriented at an angle between 0 degrees and 180 degrees with respect to patterned features on the specimen. For example, the plane of the incoming light does not have to be oriented perpendicular to patterned features, e.g., trench like structures, on the specimen but could be in any direction (from 0 to 180 degrees).

In another instance, the illumination subsystem may include only one light source (e.g., source 16 shown in FIG. 1) and light from the light source may be separated into different optical paths (e.g., by a beam splitter and/or based on wavelength, polarization, etc.) by one or more optical elements (not shown) of the illumination subsystem. Light in each of the different optical paths may then be directed to the specimen at a different AOI. Alternatively, the illumination subsystem may include only one illumination channel, and the illumination channel may be configured to direct the light to the specimen at different AOIs at different times (e.g., by changing one or more parameters of the illumination channel between scans of the specimen). The illumination subsystem may have any other suitable configuration known in the art for directing light having different or the same characteristics to the specimen at different AOIs sequentially or simultaneously.

Light source 16 and/or light source 24 may include a broadband plasma (BBP) light source. In this manner, the light generated by the light sources and directed to the specimen may include broadband light. However, the light sources may include any other suitable light sources such as lasers, which may include any suitable lasers known in the art and may be configured to generate light at any suitable wavelength(s) known in the art. In addition, the lasers may be configured to generate light that is monochromatic or nearly-monochromatic. In this manner, the lasers may be narrowband lasers. The light sources may also include polychromatic light sources that generate light at multiple discrete wavelengths or wavebands. Light sources 16 and 24 may also include different types of light sources and/or light sources having the same or different configurations.

Optical elements 18 and 26 may include optical elements such as polarizing components, spectral filters, spatial filters, reflective optical elements, apodizers, apertures, and the like, which may include any such suitable optical elements known in the art. Optical elements 18 and 26 may be different types of optical elements and/or may have the same or different configurations. Although lenses 20, 22, and 26 are shown in FIG. 1 as single refractive optical elements, in practice, each of lenses 20, 22, and 26 may include a number of refractive and/or reflective optical elements that in combination focus the light from the optical element(s) to the specimen. Beam splitter 21 may include any suitable beam splitter known in the art. The illumination subsystem shown in FIG. 1 and described herein may include any other suitable optical elements (not shown).

The output acquisition subsystem may also include a scanning subsystem configured to cause the light to be scanned over the specimen. For example, the output acquisition subsystem may include stage 30 on which specimen 14 is disposed during scanning. The scanning subsystem may include any suitable mechanical and/or robotic assembly (that includes stage 30) that can be configured to move the specimen such that the light can be scanned over the specimen. In addition, or alternatively, the output acquisition subsystem may be configured such that one or more optical elements of the output acquisition subsystem perform some scanning of the light over the specimen. The light may be scanned over the specimen in any suitable fashion.

The detection subsystem includes one or more detection channels. Each of the one or more detection channels includes a detector configured to detect light from the specimen due to illumination of the specimen and to generate output responsive to the detected light. For example, the detection subsystem shown in FIG. 1 includes two detection channels, one formed by collector 32, element 34, and detector 36 and another formed by collector 38, element 40, and detector 42. As shown in FIG. 1, the two detection channels are configured to collect and detect light at different angles of collection.

In one embodiment, the light detected by the detection subsystem due to the light directed to the specimen at the first and/or second AOIs includes specularly reflected light. For example, in some instances, both detection channels are configured to detect specularly reflected light. In particular, the detection channel that includes detector 36 may be configured to detect specularly reflected light caused by illumination at the normal AOI, and the detection channel that includes detector 42 may be configured to detect specularly reflected light caused by illumination at the oblique AOI. In a similar manner, one of the detection channels may be configured to detect light caused by illumination at one oblique AOI, and the other detection channel may be configured to detect light caused by illumination at a different oblique AOI. In this manner, different detection channels may be configured to detect light caused by illumination at different AOIs, respectively, regardless of what those AOIs are. In another embodiment, different detection channels may be configured to detect light scattered from the specimen due to illumination of the specimen with the different AOIs, respectively.

Although FIG. 1 shows an embodiment of the output acquisition subsystem that includes two detection channels, the output acquisition subsystem may include a different number of detection channels (e.g., only one detection channel or two or more detection channels). For example, one detection channel may be configured to detect light caused by illumination at one AOI in a first scan and then to detect light caused by illumination at another AOI in a second scan.

Although each of the collectors are shown in FIG. 1 as single refractive optical elements, each of the collectors may include one or more refractive optical element(s) and/or one or more reflective optical element(s). Elements 34 and 40 may include any suitable optical elements such as polarizing components, spectral filters, spatial filters, reflective optical elements, apertures, and the like, which may include any such suitable optical elements known in the art. Elements 34 and 40 may include different types of elements and/or may have the same or different configurations.

Detectors 36 and 42 may include different types of detectors and/or may have the same or different configurations. The detectors may include photo-multiplier tubes (PMTs), charge coupled devices (CCDs), time delay integration (TDI) cameras, or any other suitable detectors known in the art. The detectors may also include non-imaging detectors or imaging detectors. If the detectors are non-imaging detectors, each of the detectors may be configured to detect certain characteristics of the light such as intensity but may not be configured to detect such characteristics as a function of position within the imaging plane. As such, the output that is generated by each of the detectors included in each of the detection channels of the output acquisition subsystem may be signals or data, but not image signals or image data. In such instances, a computer subsystem such as computer subsystem 44 of the system may be configured to generate images of the specimen from the non-imaging output of the detectors. However, in other instances, the detectors may be configured as imaging detectors that are configured to generate imaging signals or image data. Therefore, the system may be configured to generate the output described herein in a number of ways.

It is noted that FIG. 1 is provided herein to generally illustrate a configuration of an output acquisition subsystem that may be included in the system embodiments described herein. Obviously, the output acquisition subsystem configuration described herein may be altered to optimize the performance of the system as is normally performed when designing a commercial system. In addition, the systems described herein may be implemented using an existing system (e.g., by adding functionality described herein to an existing system) such as the 28xx and 29xx series of inspection tools that are commercially available from KLA, Milpitas, Calif. For some such systems, the methods described herein may be provided as optional functionality of the system (e.g., in addition to other functionality of the system). Alternatively, the system described herein may be designed "from scratch" to provide a completely new system.

Computer subsystem 44 of the system may be coupled to the detectors of the output acquisition subsystem in any suitable manner (e.g., via one or more transmission media, which may include "wired" and/or "wireless" transmission media) such that the computer subsystem can receive the output generated by the detectors during scanning of the specimen. Computer subsystem 44 may be configured to perform a number of functions using the output of the detectors as described herein and any other functions described further herein. This computer subsystem may be further configured as described herein.

This computer subsystem (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems as described further herein. For example, computer subsystem 44 may be coupled to computer subsystem(s) 46 (as shown by the dashed line in FIG. 1) by any suitable transmission media, which may include any suitable wired and/or wireless transmission media known in the art. Two or more of such computer subsystems may also be effectively coupled by a shared computer-readable storage medium (not shown).

Computer subsystem(s) 44 and/or 46 may also include or be configured as one or more "virtual" systems (not shown) that are configured for performing one or more functions described further herein. Systems and methods configured as "virtual" inspection systems are described in commonly assigned U.S. Pat. No. 8,126,255 issued on Feb. 28, 2012 to Bhaskar et al. and U.S. Pat. No. 9,222,895 issued on Dec. 29, 2015 to Duffy et al., both of which are incorporated by reference as if fully set forth herein. The embodiments described herein may be further configured as described in these patents. For example, the one or more computer subsystems described herein may be further configured as described in these patents.

As further noted above, the output acquisition subsystem may be configured to generate output for the specimen with multiple modes. In general, a "mode" can be defined by the values of parameters of the output acquisition subsystem used for generating output (e.g., images) for a specimen. Therefore, modes that are different may be different in the values for at least one of the imaging parameters of the output acquisition subsystem. For example, different modes may use different wavelengths of light for illumination. The modes may be different in illumination wavelengths as described further herein (e.g., by using different light sources, different spectral filters, etc.) for different modes. In another embodiment, different modes use different illumination channels of the output acquisition subsystem. For example, as noted above, the output acquisition subsystem may include more than one illumination channel. As such, different illumination channels may be used for different modes.

The output acquisition subsystem described herein may be configured as an inspection subsystem. If that is the case, the computer subsystem(s) may be configured to receive the output from the output acquisition subsystem as described above (e.g., from detector(s) of the output acquisition subsystem) and may be configured to detect defects on the specimen based on the output as described further herein.

The output acquisition subsystem described herein may be configured as another type of semiconductor-related process/quality control type system such as a defect review system and a metrology system. For example, the embodiments of the output acquisition subsystem described herein and shown in FIG. 1 may be modified in one or more parameters to provide different output generation capability depending on the application for which it will be used. In one embodiment, the output acquisition subsystem is configured as a defect review subsystem. In another embodiment, the output acquisition subsystem is configured as a metrology subsystem. For example, the output acquisition subsystem shown in FIG. 1 may be configured to have a higher resolution if it is to be used for defect review or metrology rather than for inspection. In other words, the embodiments of the output acquisition subsystem shown in FIG. 1 describe some general and various configurations for an output acquisition subsystem that can be tailored in a number of manners that will be obvious to one skilled in the art to produce output acquisition subsystems having different capabilities that are more or less suitable for different applications.

Figure 2:
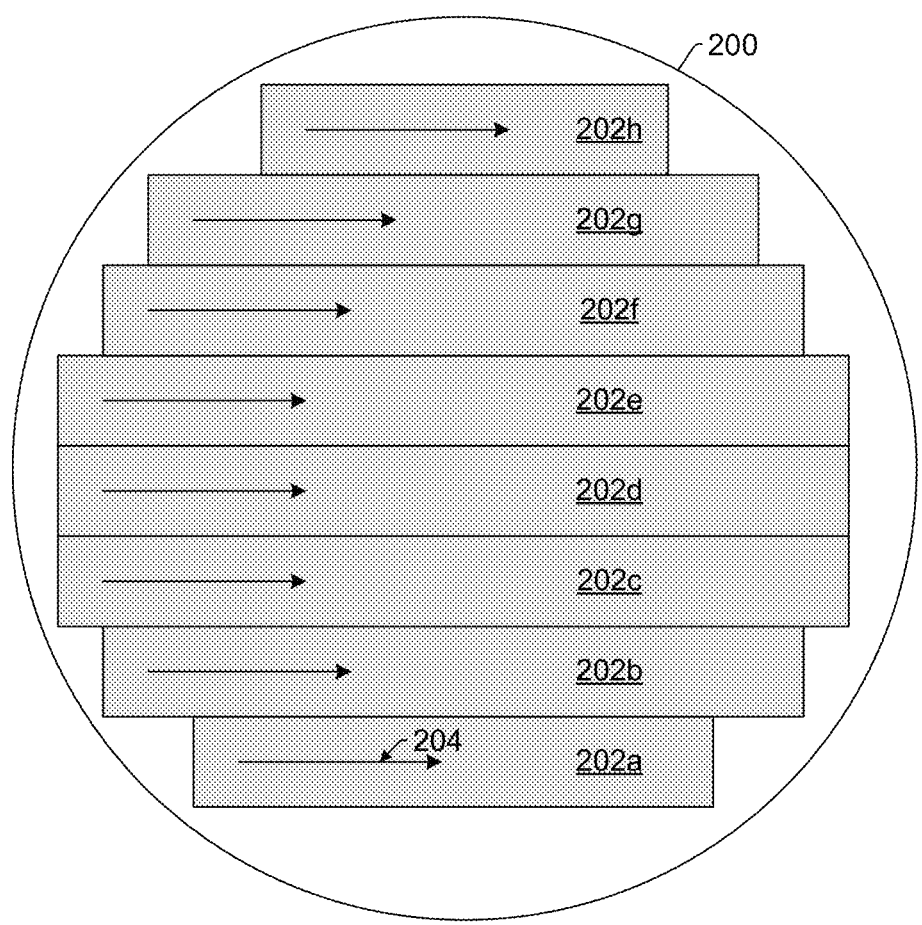
FIG. 2 is a schematic diagram illustrating a plan view of one example of swaths in a scan performed on a specimen during a process.

The one or more computer subsystems are configured for generating a focus map defined as values of best focus as a function of position on the specimen using the output generated in one or more pre-focus swaths scanned on the specimen by the output acquisition subsystem. For example, focus map generation may include scanning one or more pre-focus swaths (e.g., 3 to 5 pre-focus swaths) on the specimen following the inspection sample plan. FIG. 2 illustrates one example of an inspection sample plan. In this example, wafer 200 may be scanned in a number of swaths 202a-202h in the direction indicated by arrows 204. Although one example of a specimen, swaths, and scanning direction are shown in FIG. 2, the embodiments described herein are not limited to such a specimen, swaths, and scanning direction. Instead, the embodiments described herein can be used for any of the specimens described herein, and any scanning sample plan used for any process.

Figure 3:
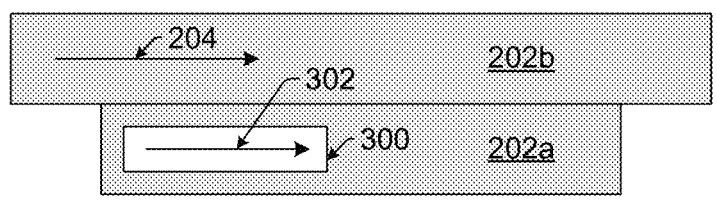
FIG. 3 is a schematic diagram illustrating a plan view of one example of swaths in a scan performed on a specimen during a process and one embodiment of pre-focus swaths in one of the swaths.

As shown in FIG. 3, in swath 202a, one or more pre-focus swaths 300 may be scanned in direction 302. As shown in FIG. 3, the one or more pre-focus swaths may be significantly smaller than the inspection swath in which they are located. The dimensions and placement of the pre-focus swath(s) within the inspection swath may be determined as described herein. Direction 302 may be the same as direction 204. In this manner, the pre-focus swath(s) may be scanned in the same direction as the inspection swaths even if the inspection swaths are scanned in a different direction than that shown in FIGS. 2 and 3. Pre-focus swath(s) may be scanned in each of the inspection swaths 202a-202h before each of the swaths are scanned for the inspection. Parameters of the pre-focus swath(s) scanned for any one swath may be different or the same and may be determined as described further herein.

In one embodiment, the output includes images of the specimen. In this manner, the embodiments described herein may be configured for image based autofocus applications. In addition, the embodiments described herein may be used with output acquisition subsystems that use broadband light such as light generated by BBP light sources. In this manner, the embodiments described herein may be configured for BBP image based autofocus applications. In addition, the embodiments described herein may be configured to use image-based focus estimates to generate an accurate focus map of the inspected (or scanned) area prior to the wafer inspection (or other specimen process).

In another embodiment, the one or more pre-focus swaths are predefined as entirely overlapping areas on the specimen. For example, as shown in FIG. 3, one or more pre-focus swaths 300 are located within the same area on the specimen. In other words, the same, entirely overlapping area on the specimen may be scanned for each pre-focus swath within an inspection swath. Defining the pre-focus swaths as entirely overlapping areas on the specimen is desirable since it is preferable that the pre-focus swaths generate data for the same x, y positions on the specimen that can be collectively used as described herein to determine best focus at each of the x, y positions.

In an additional embodiment, the one or more pre-focus swaths are scanned in a pre-defined care area containing predetermined patterned features. For example, the pre-defined care area preferably includes well-defined surface feature imagery for focus estimation. The predetermined patterned features may vary depending on the specimen for which the focus settings are being determined. For example, in the case of a 3D NAND wafer, the care area may be placed in an inspection area containing the 3D NAND line-space structure representative of the area in which constant focus is preferably maintained during the scan.

"Care areas" as they are commonly referred to in the art are areas on a specimen that are of interest for inspection purposes. Sometimes, care areas are used to differentiate areas on the specimen that are inspected from areas on the specimen that are not inspected in an inspection process. In addition, care areas are sometimes used to differentiate between areas on the specimen that are to be inspected with one or more different parameters. For example, if a first area of a specimen is more critical than a second area on the specimen, the first area may be inspected with a higher sensitivity than the second area so that defects are detected in the first area with a higher sensitivity. Other parameters of an inspection process can be altered from care area to care area in a similar manner.

Figure 4:
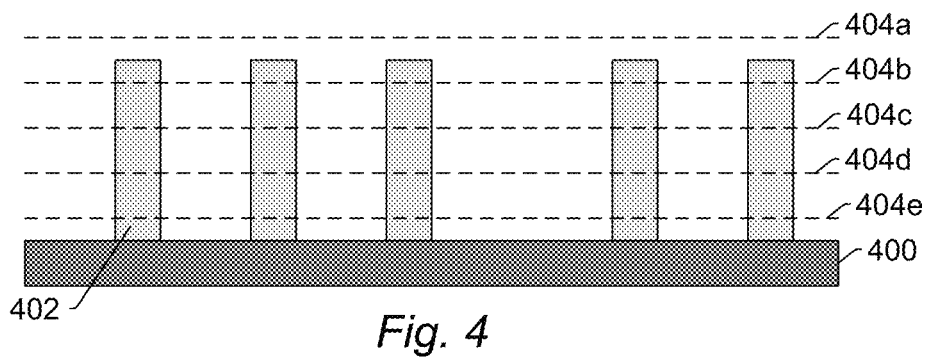
FIG. 4 is a schematic diagram illustrating a side view of one example of patterned features formed on a specimen and one embodiment of different z positions of pre-focus swaths with respect to the specimen.

In some embodiments, the one or more pre-focus swaths are scanned at different z positions with respect to the specimen. For example, the one or more pre-focus swaths may be acquired at one or more z locations (e.g., 3 to 5 z locations) to capture the variability of focus across the pre-focus swath area (e.g., within the pre-defined care areas described herein across one or more patterned feature areas (e.g., dies) on the specimen). One example of one or more pre-focus swaths at different z positions with respect to a specimen is shown in FIG. 4. As shown in FIG. 4, patterned features 402 are formed on specimen 400. Patterned features 402 are shown in FIG. 4 merely for illustrative purposes and are not meant to show patterned features having any particular dimensions, spatial relationship with respect to one another, or number. In other words, the embodiments described herein are not limited to patterned features having any particular characteristics although the embodiments described herein are particularly suitable for the patterned feature types described herein. As further shown in FIG. 4, one or more pre-focus swaths 404a-404e may be scanned at different z positions with respect to the specimen. Although a particular number of pre-focus swaths are shown in FIG. 4, the embodiments described herein are not limited to the number of pre-focus swaths shown in this figure. The z positions may be determined in any suitable manner, e.g., based on best guesses of where the best focus position might be. The best guesses may be determined based on previous scans of other specimens of the same type, scans of other similar specimens, theoretical estimates, etc.

Figure 5:
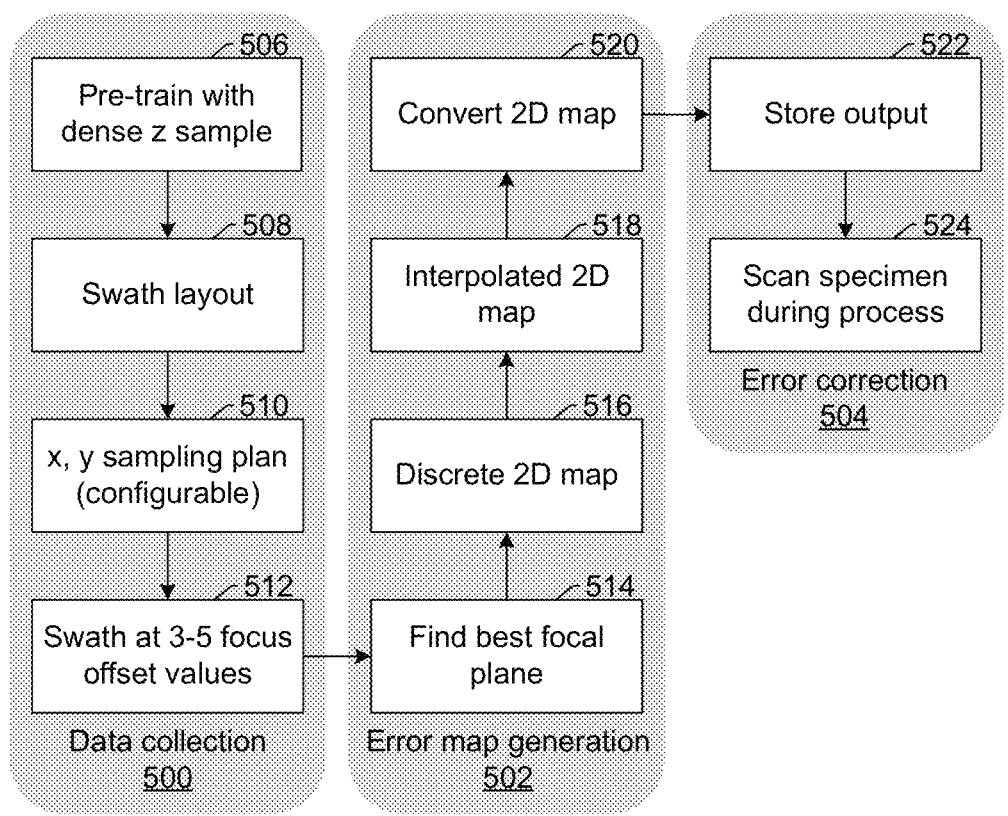
FIGS. 5 and 6 are flow diagrams illustrating embodiments of steps that may be performed for determining focus settings for use in a specimen scan.

The one or more pre-focus swaths may be scanned on the specimen during data collection phase 500 shown in FIG. 5. For example, as shown in FIG. 5, the data collection phase may include pre-training with a dense z sample, as shown in step 506. The pre-training may include pre-training a through focus curve (TFC) with a dense z sample. A through focus curve is a plot of focus metric values versus dense z (at start) or coarse z (after successfully capturing best focus during dense z). The data collection phase may also include determining swath layout, as shown in step 508. Determining the swath layout may include determining characteristics of one or more parameters of the output acquisition subsystem used to scan the pre-focus swath(s) on the specimen such as a pixel size (e.g., 200 nm), a wavelength, a gray level, a type of imaging (e.g., BF), etc. As shown in step 510, the data collection phase may also include determining an x, y sampling plan (which is configurable) for the one or more pre-focus swaths from the swath layout information determined in step 508. The sampling plan for the pre-focus swath(s) may be determined in any suitable manner. In some embodiments, the pre-focus swath sampling plan may be the same as the inspection (or other process) sampling plan. However, the pre-focus swath sampling plan may be more sparse than the inspection (or other process) sampling plan and may be determined based on various information such as the patterned features on the specimen, the process that is being performed on the specimen, any known or expected across specimen variation, and the like. The data collection phase may also include swathing at 3-5 focus offset values, as shown in step 512, to generate the one or more pre-focus swaths of output. Scanning the pre-focus swaths in step 512 may be performed as described further herein. The swathing performed in step 512 may also include logging a readout of the z stage position as a function of x.

In a further embodiment, generating the focus map includes determining focus metrics as a function of x and y positions within the one or more pre-focus swaths, and determining the focus metrics at one of the x and y positions includes determining the focus metrics from all of the output generated in the one or more pre-focus swaths at the one of the x and y positions. For example, the focus metrics may be computed for each set of z imagery at approximately 0.3 um spacing in x and at the center of each 1 k sub swath in y. The number of subswaths per swath may depend on the detector configuration and how pixel height is broken into jobs vertically. In one example, there may be 4 to 8 subswaths for a total swath height of 4 k to 8 k of pixels. These measurements may be a kind of coarse z measurements.

In another embodiment, generating the focus map includes determining focus metrics as a function of x and y positions within the one or more pre-focus swaths, the focus metrics include coarse z focus measurements, and generating the focus map includes fitting the coarse z focus measurements to a polynomial, estimating best focus at the x and y positions at the peak of the polynomial, and generating the focus map for x and y positions in a sample plan for the scan performed on the specimen during the process from the best focus at the x and y positions within the one or more pre-focus swaths. For example, the computer subsystem(s) may be configured for fitting the focus metrics from a set of z values to a polynomial to estimate the best focus in semiconductor inspection and other applications described herein. In one such embodiment, each x, y location of coarse z focus metric measurements, which may be determined as described above, may then be fit to a polynomial and the best focus is estimated at the peak of the polynomial. The polynomial to which the measurements are fitted may include any suitable polynomial such as a 2nd order parabola or a Gaussian.

The z value at best focus may then be used to generate the focus correction map for each x, y in the inspection sample plan. These steps may be performed during error map generation phase 502 shown in FIG. 5. For example, as shown in step 514, the error map generation phase may include finding the best focal plane, which may be performed as described above. In one such example, step 514 may include fitting the data from the data collection phase to a through focus curve and finding the best focal plane. In addition, as shown in step 516, the error map generation phase may include generating a discrete two-dimensional (2D) map, which may be performed as described above.

The one or more computer subsystems are also configured for interpolating the focus map to generate focus settings for a scan performed on the specimen during a process. For example, as shown in FIG. 5, during the error map generation phase, the one or more computer subsystems may generate interpolated 2D map 518 from the discrete 2D map generated in step 516. The error generation phase may also include converting the 2D map, as shown in step 520, which may include converting the interpolated 2D map into information, data, instructions, etc. that can be used by the system to control the focus of the output acquisition subsystem during a scan of the specimen. For example, the interpolated 2D map may be converted into an actual z stage position readout.

In one embodiment, the interpolating includes interpolating the focus map to generate the focus settings for a full sample plan of the scan performed on the specimen during the process. For example, the focus map generated as described above may be interpolated to provide estimates across the full inspection sample plan. In other words, even though the data collection phase may be performed using pre-focus swaths that are smaller than the inspection swaths, the focus map may be interpolated to generate focus settings for the entire inspection swaths. In particular, given the repeating nature of printed areas on specimens such as those described herein as well as additional information that may be available to the computer subsystem(s), e.g., specimen profile(s), the focus settings may be generated for the scan across a larger specimen area than that used for the data collection phase. The interpolation of the focus map may be performed in any suitable manner known in the art using any suitable function, algorithm, calculations, etc.

The one or more computer subsystems are further configured for storing information for the generated focus settings for use in the scan performed on the specimen during the process. The generated focus settings may then be applied as a swath trajectory during inspection, metrology, etc. The "swath trajectory" can be generally defined as a predetermined set of z positions along the scan direction, e.g., x travel. In standard autofocus, there is a servo loop controlling z. In contrast, in the embodiments described herein, the pre-focus map best focus z values may be loaded to the stage height motor with no feedback. For example, during error correction phase 504 shown in FIG. 5, the computer subsystem(s) may store the output, as shown in step 522, which may include the converted 2D map and any output of any of the other steps described herein. The output may be stored in step 522 by saving the output in a database or in another manner described herein. The error correction phase may also include scanning the specimen during the process, as shown in step 514. In one such example, the embodiments may use the stored information for the generated focus settings to control autofocus subsystem 100 of the system shown in FIG. 1.

Autofocus subsystem 100 may include any suitable mechanical, robotic, computer hardware and/or software, etc. components that can be used to change the z position of the specimen with respect to the output acquisition subsystem components or vice versa. In this manner, the z position of the specimen relative to the output acquisition subsystem can be controlled based on the output stored in step 522. For example, as shown in FIG. 1, computer subsystem(s) 44 and/or 46 may be coupled to autofocus subsystem 100 as described above such that the computer subsystem(s) cause the autofocus subsystem to move stage 30 of the scanning subsystem based on the generated focus settings. Alternatively, the computer subsystem(s) may not control the autofocus subsystem but may simply send the generated focus settings to the autofocus subsystem, which then controls the position of stage based on the generated focus settings. Alternatively or in addition, the autofocus subsystem may be similarly coupled to the output acquisition components of subsystem 10 and configured to alter a position of the output acquisition components relative to the specimen based on the generated focus settings. The autofocus subsystem may also be an integral part of the scanning subsystem described above or a separate component coupled thereto. The autofocus subsystem may also include any suitable commercially available autofocus subsystem such as a servo-controlled optics based autofocus system.

The focus settings may be determined as described herein depending on where the focal plane for a scan of the specimen is desired. For example, the best focus of most of the processes described herein may be at the uppermost surface of the specimen, e.g., to ensure the highest sensitivity for defects on the uppermost surface or to ensure the highest sensitivity for measurements of patterned features on the uppermost surface. However, different focal planes may be more appropriate for some scans versus others. For example, in some cases, the DOIs may be located at the bottom of patterned features and/or underneath the uppermost surface of the specimen. In such a case, the best focus may be below the uppermost surface of the specimen and/or at or near the bottom of the patterned features. In one such example, defects can occur at any level and defects typically get harder to detect with increasing depth. Different depths can be targeted by applying a fixed focus offset as the autofocus feature focuses on a fixed plane of sharpest pattern for the particular optics mode. The fixed plane of best focus could be the top surface or it could be deeper if the wavelength penetrates to image the underlying pattern sharper.

Figure 6:
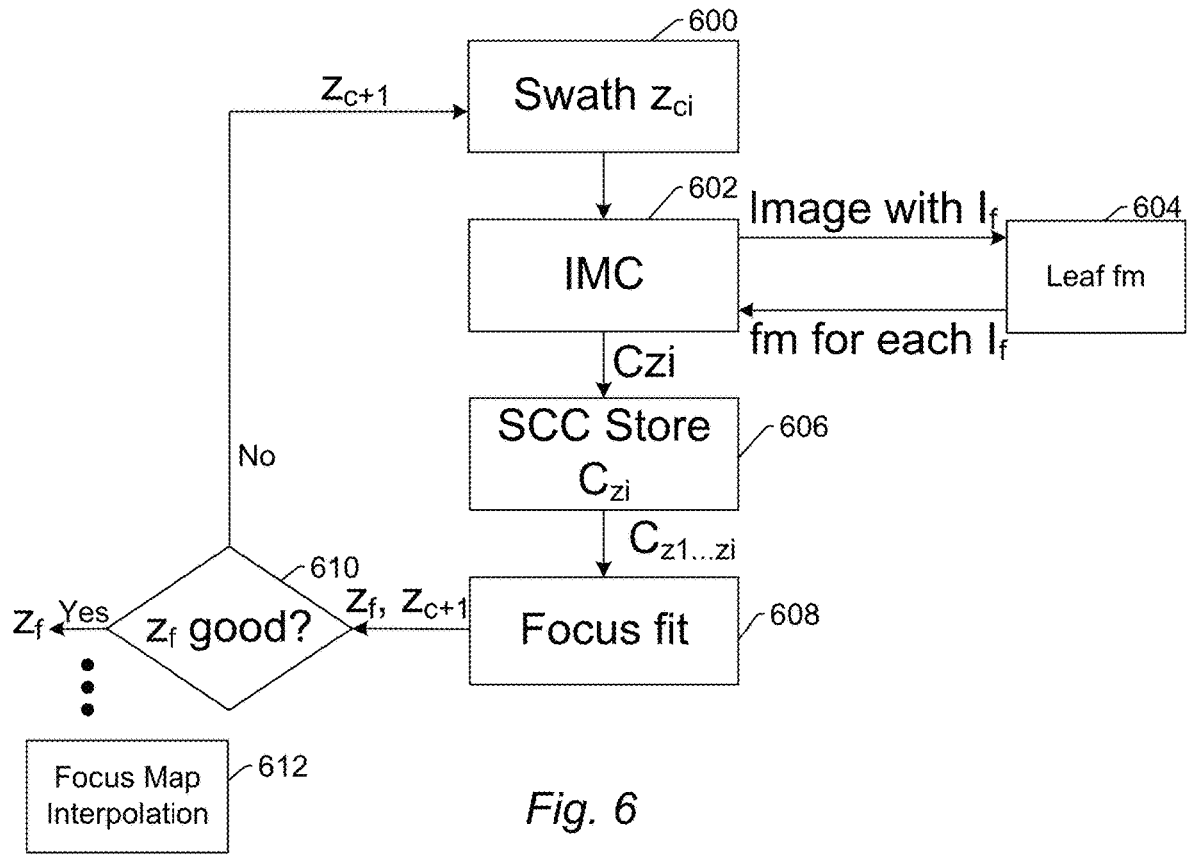

FIG. 6 illustrates another embodiment of steps that may be performed by the embodiments described herein for focus map generation. In phase 1 of this focus map generation, the steps are performed for the next $Z_{ci}$ in recipe, where $Z_c$ is the z values of the pre-focus swaths and i is greater than or equal to 3. In phase 2 of this focus map generation, the steps are performed for the predicted next $Z_{ci}$.

As shown in step 600, the focus map generation may include scanning the first pre-focus swath at $z=Z_{ci}$, which may be performed as described herein. The output generated in that scan may be sent to IMC 602. IMC 602 may create and submit jobs to Leaf fm 604. The job input image may include one or more focus areas or image with $I_f$. The job output may be fm for each focus area, where fm=focus metric for any focus image area, $I_f$. The job parameters may contain x, y, z of each focus area.

The IMC returns $C_{zi}$ to system control computer (SCC) 606 from each focus area in the swath. The SCC keeps track of the $C_{z1 \ldots zi}$ array, where $C_{z1 \ldots zi}$=coarse focus measurements at 3-5 points ($Z_c$, fm), which may include filling up the array for each successive swath. In other words, the SCC may collect the focus metric data from the image computer and perform the fitting/interpolation and focus map generation described further herein.

As shown in step 608, the focus fit may be performed with inputs $C_{z1 \ldots zi}$ to compute focus $Z_f$ (best focus correction for focus map) or predict next swath, $Z_{c+1}$. The concept of predicting the next swath is that if the best focus cannot be computed, then the coarse z values are probably out of focus range and different z values can be intelligently retried in the next swath. In implementation, predicting the next swath may be performed by extrapolating from a focus curve without a peak (directing the retry z to go in the direction of better focus). Computing $Z_f$ may include fitting to a polynomial as described further herein. The focus fit may output $Z_f$ and $Z_{c+1}$.

The one or more computer subsystems may then determine if $Z_f$ is good, as shown in step 610. If $Z_f$ is determined to be good, then, after the coarse map across the specimen is completed (after completion of the pre-focus swath scans), the one or more computer subsystems may perform focus map interpolation, as shown in step 612. In this step, the one or more computer subsystems may calculate the focus map for fewer than all of the inspection swaths and then use that to interpolate a focus map for other inspection swaths without performing any coarse focus measurements in those other inspection swaths. In one such example, all of the coarse data from every subswath may be averaged to get the swath value (only one value is allowable in y along the swath at any given x) and then interpolate in x to go from the coarsely x-positioned care areas to a continuous map over x. If $Z_f$ is not determined to be good, then $Z_{c+1}$ may be used to reperform step 600.

The one or more computer subsystems may then store and apply the focus map, $F_{map}$=Focus Map(x, y, $Z_f$), for inspection or another process for which the focus map is being generated. During inspection or the other process then, the output acquisition subsystem may change the z position all along the x swath.

In one embodiment, generating the focus map, interpolating the focus map, and storing the information are performed during the process and separately for first and second swaths in the scan performed on the specimen during the process, the first swath is scanned before the second swath, and the one or more computer subsystems are configured for determining one or more parameters of the one or more pre-focus swaths scanned for the second swath based on results of estimating the best focus performed for the first swath. For example, the embodiments described herein may be configured for feeding forward the trajectory of a previous swath as the starting z value for the next swath and then requiring fewer z swaths to estimate best focus in the subsequent swath. The feeding forward of the previous swath's best z trajectory helps ensure that the next swath's best focus is maintained within the coarse measurement range.

In some embodiments, the scan is performed on the specimen during the process based on the generated focus settings determined prior to the scan, and the generated focus settings are not altered during the scan. In other words, once the generated focus settings are determined as described herein, there does not need to be any dynamic or on-the-fly alteration of the focus settings. In particular, the embodiments described herein can be used to reliably estimate the best focus settings across the entire sample plan of a scan thereby effectively eliminating measuring and altering focus settings during the scan, which should reduce the time and resources needed for the scan.

In another embodiment, the scan performed on the specimen during the process does not include autofocusing of the output acquisition subsystem. For example, systems and methods that perform the specimen scan during the process may use a focus map generated as described herein during the process in place of traditional autofocusing methods and systems. In this manner, although an autofocus subsystem such as that described further herein may be used for adjusting the focus settings of the output acquisition subsystem relative to the specimen during a scan based on the generated focus settings, the autofocus subsystem does not need to do any autofocusing in real time by making any additional measurements and adjustments to the system. In this manner, the autofocus map may be established prior to the scan and then used without adjustment to the focus settings in the autofocus map.

In an additional embodiment, the one or more pre-focus swaths are located within a first swath in the scan performed on the specimen during the process, and generating the focus map, interpolating the focus map, and storing the information are performed during the process performed on the specimen. For example, in some embodiments, the process may include performing the scanning of the one or more pre-focus swaths in the first swath in the scan. The focus settings for the entire scan may then be determined based on the results of the scanning of those pre-focus swath(s). In this manner, the one or more pre-focus swaths may be located in only the first swath scanned in the process. In addition, the one or more pre-focus swaths may be scanned in the first swath only for each and every specimen on which the process is performed. In other words, as part of the process performed on multiple specimens, one or more pre-focus swaths may be scanned in the first swath on the first specimen and then the scan of the first specimen may be performed using the focus settings generated from those scans as described herein, and then that process may be repeated for each of the other specimens. In this manner, focus settings may be independently and separately generated for the entire scan of each specimen from the pre-focus swaths in the first swath on each specimen, respectively.

In a further embodiment, generating the focus map, interpolating the focus map, and storing the information are performed during the process and separately for first and second swaths in the scan performed on the specimen during the process, and the first swath is scanned before the second swath. In this manner, the steps described herein may be performed separately and independently for different swaths on a specimen. For example, one or more pre-focus swaths in a first swath on a specimen may be used for generating focus settings for the entire first swath, one or more pre-focus swaths in a second swath on the specimen may be used for generating focus settings for the entire second swath, and so on. In this manner, pre-focus swath scans may be performed before each swath in a scan to generate independent focus setting maps for each swath. Generating the focus settings for each swath may otherwise be performed as described further herein.

In one such embodiment, a number of the one or more pre-focus swaths used for generating the focus map for the first swath is greater than a number of the one or more pre-focus swaths used for generating the focus map for the second swath. For example, the embodiments described herein may be configured to use one or more additional sets of z values in the first swath to ensure accurate best focus. Using more pre-focus swaths in the first swath in a scan may be advantageous because the specimen to specimen variation in best focus settings may be greater than the within specimen variation. In other words, even if the focus settings for a similar specimen or a specimen of the same type that will be scanned in a process are known, the focus settings can vary relatively dramatically from specimen-to-specimen due to, for example, variations in the processes performed on the specimens. Therefore, a greater number of pre-focus swaths may be advantageous for the first swath to ensure that accurate best focus settings can be found for the first swath. However, once the best focus settings are found using the pre-focus swaths in the first swath, fewer pre-focus swath(s) may be needed in the second (and subsequent) swaths because the focus settings may not change relatively dramatically from swath to swath on the same specimen. In addition, as described further herein, the results generated using pre-focus swath(s) in one swath can be fed forward to pre-focus swath(s) in other swaths on the same specimen. In this manner, based on the results generated using the pre-focus swath(s) in one swath, the parameters such as number of the pre-focus swath(s) in another, subsequent swath can be determined.

In another such embodiment, the one or more computer subsystems are configured for determining one or more parameters of the one or more pre-focus swaths scanned on the specimen for the second swath based on the focus settings generated for the first swath. For example, the embodiments described herein may be configured for feeding forward the trajectory of a previous swath as the starting z value for the next swath and then requiring fewer z, pre-focus swaths to estimate best focus. In an additional example, the computer subsystem(s) may be configured for adaptive feedforward from the polynomial coarse z fitting algorithm for a better estimate of initial z trajectory, e.g., if measurements are significantly biased from nominal z, this bias can be removed from the subsequent swath(s).

In a further embodiment, the output acquisition subsystem is configured for performing the scan on the specimen during the process with the generated focus settings, and the one or more computer subsystems are configured for during the scan, applying a specimen surface profile to the generated focus settings thereby determining final focus settings used for the scan of the specimen during the process. For example, the embodiments described herein may be configured for applying a real time wafer surface profile to the coarse z swaths to correct for trends in the wafer chuck surface. The wafer surface profile may be the predefined function of the chuck surface. The system may run a calibration periodically to determine such a predefined function to help keep the coarse z pre-map within best focus capture. Determining the predefined function may be performed during pre-map coarse z focus scans. Applying the specimen surface profile to the generated focus settings may include adding the surface profile to the default z (at start) and feeding forward the trajectories.

The computer subsystem(s) may be configured to store the information for the generated focus settings in a recipe or by generating a recipe for the process in which the specimen scan will be performed. A "recipe" as that term is used herein can be generally defined as a set of instructions that can be used by a tool to perform a process on a specimen. In this manner, generating a recipe may include generating information for how a process is to be performed, which can then be used to generate the instructions for performing that process. The information for the generated focus settings that is stored by the computer subsystem(s) may include any information that can be used to cause the generated focus settings to be applied to the output acquisition subsystem and/or scanning subsystem during the scan. The information for the generated focus settings that is stored may also include the actual generated focus settings themselves and/or any instructions for causing the generated focus settings to be applied during the scan.

The computer subsystem(s) may be configured for storing the information for the generated focus settings in any suitable computer-readable storage medium. The information may be stored with any of the results described herein and may be stored in any manner known in the art. The storage medium may include any storage medium described herein or any other suitable storage medium known in the art. After the information has been stored, the information can be accessed in the storage medium and used by any of the method or system embodiments described herein, formatted for display to a user, used by another software module, method, or system, etc. For example, the embodiments described herein may generate or modify an inspection recipe to include the generated focus settings. That generated or modified inspection recipe may then be stored and used by the system or method (or another system or method) to inspect the specimen or other specimens to thereby generate information (e.g., defect information) for the specimen or other specimens.

In one embodiment, the one or more computer subsystems are configured for determining one or more characteristics of the specimen based on the generated focus settings. For example, the focus map itself (i.e., best image focus vs. autofocus servo position) can hold valuable information about the specimen. In one such example, the generated focus settings may be responsive to changes in one or more characteristics of the specimen such as thickness of a film or patterned features on the specimen as a function of position on the specimen. In particular, since the generated focus settings are responsive to position of a specimen surface or feature(s) relative to the focal plane of the output acquisition subsystem, the generated focus settings are also responsive to variation in the z position of the specimen surface or feature(s) across the specimen. In one such example, the generated focus settings may be responsive to changes in the z position of an uppermost surface of the specimen or other characteristics of the patterned features, films, etc. that form the uppermost surface of the specimen as a function of position on the specimen. The generated focus settings may be similarly responsive to characteristics of the specimen when the desired in-focus position is below the uppermost surface of the specimen. The generated focus settings may be used by the computer subsystem(s) to determine various characteristics of the specimen both globally (as in an average or median characteristic determined from all of the generated focus settings) and locally (as in a map of a characteristic of the specimen as a function of specimen position, a local average or median, etc.). The generated focus settings can therefore be used as a measure of one or more characteristics of the specimen (through which the one or more characteristics can be inferred or directly determined), which can be used by the one or more computer subsystems for other step(s) described further herein.

The systems described herein or another system or method may then use the stored information to perform a scan of the specimen and to determine information about the specimen from the scan output (e.g., images, signals, etc.). Depending on the process being performed on the specimen, that determined information may include defect information (e.g., in the case of an inspection or defect review), patterned feature measurements (e.g., in the case of a metrology process), and the like. The inspection, defect review, and metrology processes may include any such suitable processes known in the art. Output generated by the systems for such processes may include any suitable results such as a standard inspection results file like a KLARF, which is a type of inspection results file output by some inspection tools commercially available from KLA, a standard metrology results file, a standard defect review results file, etc.

The systems may also be configured for performing one or more functions based on the information determined for the specimen. Such functions include, but are not limited to, altering a process such as a fabrication process or step that was or will be performed on the specimen in a feedback or feedforward manner. For example, the virtual system and other computer subsystems described herein may be configured to determine one or more changes to a process that was performed on a specimen inspected as described herein and/or a process that will be performed on the specimen based on the detected defect(s). The changes to the process may include any suitable changes to one or more parameters of the process. The virtual system and/or other computer subsystems described herein preferably determine those changes such that the defects can be reduced or prevented on other specimens on which the revised process is performed, the defects can be corrected or eliminated on the specimen in another process performed on the specimen, the defects can be compensated for in another process performed on the specimen, etc. The virtual system and other computer subsystems described herein may determine such changes in any suitable manner known in the art.

Those changes can then be sent to a semiconductor fabrication system (not shown) or a storage medium (not shown) accessible to the virtual system or other computer subsystems described herein and the semiconductor fabrication system. The semiconductor fabrication system may or may not be part of the system embodiments described herein. For example, the virtual system and other computer subsystems described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

In one embodiment, the one or more computer subsystems are configured for determining one or more changes to one or more parameters of a fabrication process performed on the specimen based on the determined one or more characteristics of the specimen. For example, as described further above, the generated focus settings may be used by the one or more computer subsystems to determine one or more characteristics of the specimen. Those characteristic(s)

may then be used by the computer subsystem(s) to determine change(s) to parameter(s) of a fabrication process such as those described above. In one such example, if the characteristic(s) indicate that there is variation in thickness of patterned features across the specimen, that variation may be used to determine change(s) to parameter(s) of a process used to form the patterned features on the specimen such as a lithography process, an etch process, a CMP process, etc. The change(s) to the parameter(s) of the fabrication process may otherwise be determined using any suitable algorithm, relationship, function, etc. known in the art.

The one or more computer subsystems may also determine which process or processes should be changed in response to the characteristic(s) of the specimen. In other words, the computer subsystem(s) may determine change(s) to one or more processes performed on the specimen in response to the determined characteristic(s). In this manner, the focus map itself, which can hold valuable information about the specimen, can be used to control the process(es) used to make the specimen. In a similar manner, the focus map can be used to determine one or more changes to a process not yet performed on the specimen with the intention of changing or compensating for the characteristic(s) of the specimen determined from the focus map. Such processes can include repair processes and subsequent fabrication processes that, in their normal and usual operation, can alter the determined characteristic(s) of the specimen.

In one embodiment, the process is an inspection process. The inspection process may be performed in any suitable manner. For example, in general, the term "inspection process" is used herein to refer to a process in which defects are detected on specimens. Detecting defects on the specimens may be performed in a variety of different ways including, for example, comparing or applying a threshold to output generated for the specimen by an inspection tool or system and determining that any output having a value above the threshold corresponds to a potential defect or defect candidate and that any output that does not have a value above the threshold does not correspond to a potential defect or defect candidate.

In some embodiments, the process is an inspection process that includes detecting defects on the specimen, and the one or more computer subsystems are configured for determining the one or more changes based on the determined one or more characteristics of the specimen in combination with information for the detected defects generated by the inspection process. For example, the focus map itself can be used to determine information about the specimen as described above, and that information about the specimen can be used in conjunction with defect inspection results in order to control the process used to make the specimen. The one or more computer subsystems may use the characteristic(s) determined for the specimen from the generated focus settings with the information for the detected defects to determine the change(s) to the parameter(s) of the fabrication process as described further above. The information for the detected defects may include any of such information described herein or known in the art.

In one such example, there may be some relationship between the characteristic(s) of the specimen and one or more of the detected defects (e.g., some or all of the detected defects may be due, at least in part, to the characteristic(s) of the specimen determined from the generated focus settings or vice versa) and/or one or more of the detected defects may be independent of the characteristic(s) determined from the generated focus settings. In this manner, the determined specimen characteristic(s) and the detected defects may have a common or related cause or may have separate, unrelated causes. As such, the changes(s) to the parameter(s) of the fabrication process may advantageously be determined in response to the determined characteristic(s) in combination with the detected defects so that the cause(s) of any undesirable characteristic(s) and detected defects may be accurately identified and corrected.

In another embodiment, the process is a metrology process. For example, metrology processes may be performed using one of the systems described further herein. The metrology process may be performed in any suitable manner known in the art. In another embodiment, the process is a defect review process, which may be performed in any suitable manner known in the art.

The embodiments described herein have a number of advantages over other methods and systems for determining focus settings for use in a specimen scan. For example, the embodiments described herein advantageously use output described herein such as inspection imagery to measure and estimate the best focus. In addition, the embodiments described herein advantageously use features in the imagery to provide a reliable and repeatable estimate of the best focus.

Each of the embodiments of the system may be further configured according to any other embodiment(s) described herein.

Another embodiment relates to a computer-implemented method for determining focus settings for use in a specimen scan. The method includes generating a focus map defined as values of best focus as a function of position on a specimen using output generated in one or more pre-focus swaths scanned on the specimen by an output acquisition subsystem configured as described herein. The method also includes interpolating the focus map to generate focus settings for a scan performed on the specimen during a process. The method further includes storing information for the generated focus settings for use in the scan performed on the specimen during the process. The generating, interpolating, and storing are performed by one or more computer subsystems coupled to the output acquisition subsystem. The computer subsystem(s) may be further configured as described herein.

Each of the steps of the method may be performed as described further herein. The method may also include any other step(s) that can be performed by the output acquisition subsystem, computer subsystem(s), and/or system(s) described herein. The method described above may be performed by any of the system embodiments described herein.

Figure 7:
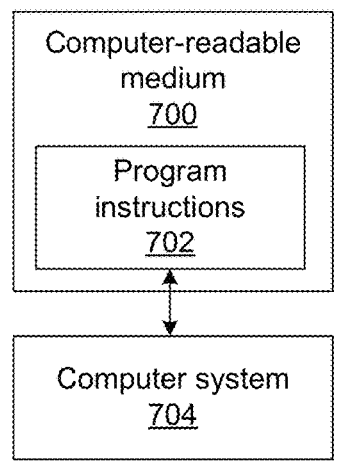
FIG. 7 is a block diagram illustrating one embodiment of a non-transitory computer-readable medium storing program instructions executable on a computer system for performing one or more of the computer-implemented methods described herein.

An additional embodiment relates to a non-transitory computer-readable medium storing program instructions executable on a computer system for performing a computer-implemented method for determining focus settings for use in a specimen scan. One such embodiment is shown in FIG. 7. In particular, as shown in FIG. 7, non-transitory computer-readable medium 700 includes program instructions 702 executable on computer system 704. The computer-implemented method may include any step(s) of any method(s) described herein.

Program instructions 702 implementing methods such as those described herein may be stored on computer-readable medium 700. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 704 may be configured according to any of the embodiments described herein.

Further modifications and alternative embodiments of various aspects of the invention will be apparent to those skilled in the art in view of this description. For example, methods and systems for determining focus settings for use in a specimen scan are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured for determining focus settings for use in a specimen scan, comprising:
    an output acquisition subsystem configured to direct energy to a specimen, to detect energy from the specimen, and to generate output responsive to the detected energy; and
    one or more computer subsystems configured for:
        generating a focus map defined as values of best focus as a function of position on the specimen using the output generated in one or more pre-focus swaths scanned on the specimen by the output acquisition subsystem;
        interpolating the focus map to generate focus settings for a scan performed on the specimen during a process; and
        storing information for the generated focus settings for use in the scan performed on the specimen during the process, wherein the one or more pre-focus swaths are located within a first swath in the scan performed on the specimen during the process, and wherein generating the focus map, interpolating the focus map, and storing the information are performed during the process performed on the specimen.

2. The system of claim 1, wherein the specimen comprises a wafer having 3D NAND structures formed thereon.

3. The system of claim 1, wherein the output comprises images of the specimen.

4. The system of claim 1, wherein the one or more pre-focus swaths are scanned at different z positions with respect to the specimen.

5. The system of claim 1, wherein the one or more pre-focus swaths are predefined as entirely overlapping areas on the specimen.

6. The system of claim 1, wherein the one or more pre-focus swaths are scanned in a pre-defined care area containing predetermined patterned features.

7. The system of claim 1, wherein generating the focus map comprises determining focus metrics as a function of x and y positions within the one or more pre-focus swaths, and wherein determining the focus metrics at one of the x and y positions comprises determining the focus metrics from all of the output generated in the one or more pre-focus swaths at the one of the x and y positions.

8. The system of claim 1, wherein generating the focus map comprises determining focus metrics as a function of x and y positions within the one or more pre-focus swaths, wherein the focus metrics comprise coarse z focus measurements, and wherein generating the focus map further comprises fitting the coarse z focus measurements to a polynomial, estimating best focus at the x and y positions at the peak of the polynomial, and generating the focus map for x and y positions in a sample plan for the scan performed on the specimen during the process from the best focus at the x and y positions within the one or more pre-focus swaths.

9. The system of claim 8, wherein generating the focus map, interpolating the focus map, and storing the information are further performed during the process and separately for the first swath and a second swath in the scan performed on the specimen during the process, wherein the first swath is scanned before the second swath, and wherein the one or more computer subsystems are further configured for determining one or more parameters of the one or more pre-focus swaths scanned for the second swath based on results of estimating the best focus performed for the first swath.

10. The system of claim 1, wherein said interpolating comprises interpolating the focus map to generate the focus settings for a full sample plan of the scan performed on the specimen during the process.

11. The system of claim 1, wherein the generated focus settings are not altered during the scan.

12. The system of claim 1, wherein the scan performed on the specimen during the process does not comprise autofocusing of the output acquisition subsystem.

13. The system of claim 1, wherein generating the focus map, interpolating the focus map, and storing the information are further performed during the process and separately for the first swath and a second swath in the scan performed on the specimen during the process, and wherein the first swath is scanned before the second swath.

14. The system of claim 13, wherein a number of the one or more pre-focus swaths used for generating the focus map for the first swath is greater than a number of the one or more pre-focus swaths used for generating the focus map for the second swath.

15. The system of claim 13, wherein the one or more computer subsystems are further configured for determining one or more parameters of the one or more pre-focus swaths scanned on the specimen for the second swath based on the focus settings generated for the first swath.

16. The system of claim 1, wherein the output acquisition subsystem is further configured for performing the scan on the specimen during the process with the generated focus settings, and wherein the one or more computer subsystems are further configured for during the scan, applying a specimen surface profile to the generated focus settings thereby determining final focus settings used for the scan of the specimen during the process.

17. The system of claim 1, wherein the one or more computer subsystems are further configured for determining one or more characteristics of the specimen based on the generated focus settings.

18. The system of claim 17, wherein the one or more computer subsystems are further configured for determining one or more changes to one or more parameters of a fabrication process performed on the specimen based on the determined one or more characteristics of the specimen.

19. The system of claim 18, wherein the process is an inspection process that comprises detecting defects on the specimen, and wherein the one or more computer subsystems are further configured for determining the one or more changes based on the determined one or more characteristics of the specimen in combination with information for the detected defects generated by the inspection process.

20. The system of claim 1, wherein the process is an inspection process.

21. The system of claim 1, wherein the energy directed to the specimen comprises light, and wherein the energy detected from the specimen comprises light.

22. A non-transitory computer-readable medium, storing program instructions executable on a computer system for performing a computer-implemented method for determining focus settings for use in a specimen scan, wherein the computer-implemented method comprises:

generating a focus map defined as values of best focus as a function of position on a specimen using output generated in one or more pre-focus swaths scanned on the specimen by an output acquisition subsystem configured to direct energy to the specimen, to detect energy from the specimen, and to generate output responsive to the detected energy;

interpolating the focus map to generate focus settings for a scan performed on the specimen during a process; and storing information for the generated focus settings for use in the scan performed on the specimen during the process, wherein said generating, interpolating, and storing are performed by the computer system coupled to the output acquisition subsystem, wherein the one or more pre-focus swaths are located within a first swath in the scan performed on the specimen during the process, and wherein generating the focus map, interpolating the focus map, and storing the information are performed during the process performed on the specimen.

23. A computer-implemented method for determining focus settings for use in a specimen scan, comprising:

generating a focus map defined as values of best focus as a function of position on a specimen using output generated in one or more pre-focus swaths scanned on the specimen by an output acquisition subsystem configured to direct energy to the specimen, to detect energy from the specimen, and to generate output responsive to the detected energy;

interpolating the focus map to generate focus settings for a scan performed on the specimen during a process; and storing information for the generated focus settings for use in the scan performed on the specimen during the process, wherein said generating, interpolating, and storing are performed by one or more computer subsystems coupled to the output acquisition subsystem, wherein the one or more pre-focus swaths are located within a first swath in the scan performed on the specimen during the process, and wherein generating the focus map, interpolatingthe focus map, and storing the information are performed during the process performed on the specimen.

* * * * *